2 Sheets--Sheet 1.
JOHN NAUGLE.
Improvement in Tire-bending and Shrinking Machines.
No. 123,190. Patented Jan. 30, 1872.
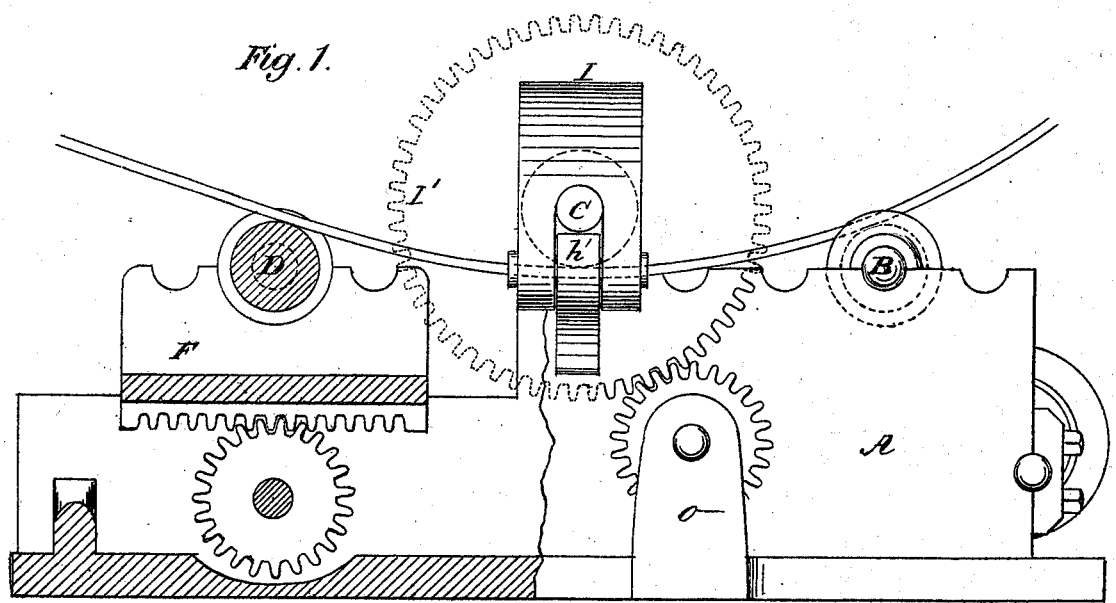
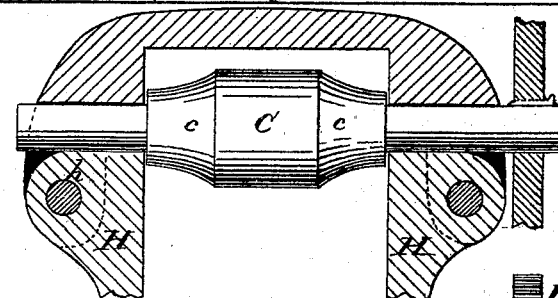
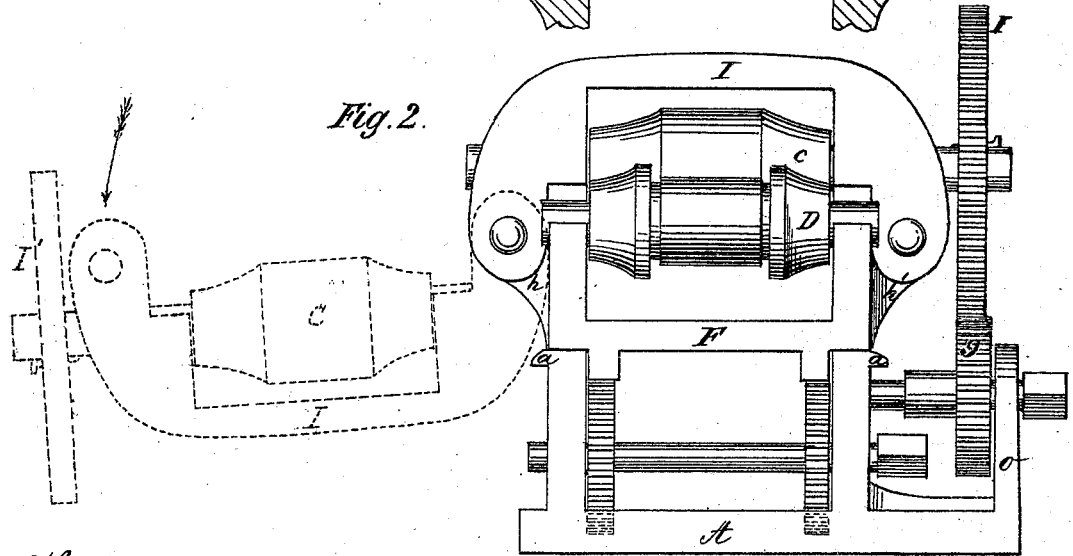
Witnesses:
Fred. Artos
Herm. Lauten
Inventor:
John Naugle 2 Sheets--Sheet 2.

JOHN NAUGLE.
Improvement in Tire-bending and Shrinking Machines.
No. 123,190. Patented Jan. 30, 1872.

Witnesses:
Fred. Artos.
Herm. Lauten.

Inventor:
John Naugle ns.123,190

UNITED STATES PATENT OFFICE.

JOHN NAUGLE, OF MOORESVILLE, INDIANA.

IMPROVEMENT IN TIRE-BENDING AND SHRINKING MACHINES.

Specification forming part of Letters Patent No. 123,190, dated January 30, 1872.

*To all whom it may concern:*

Be it known that I, JOHN NAUGLE, of Mooresville, county of Morgan and State of Indiana, have invented certain Improvements in Tire-Bending and Shrinking Machines, of which the following is a full, clear, and exact description, reference being had to the accompanying drawing, in which—

Figure 4:
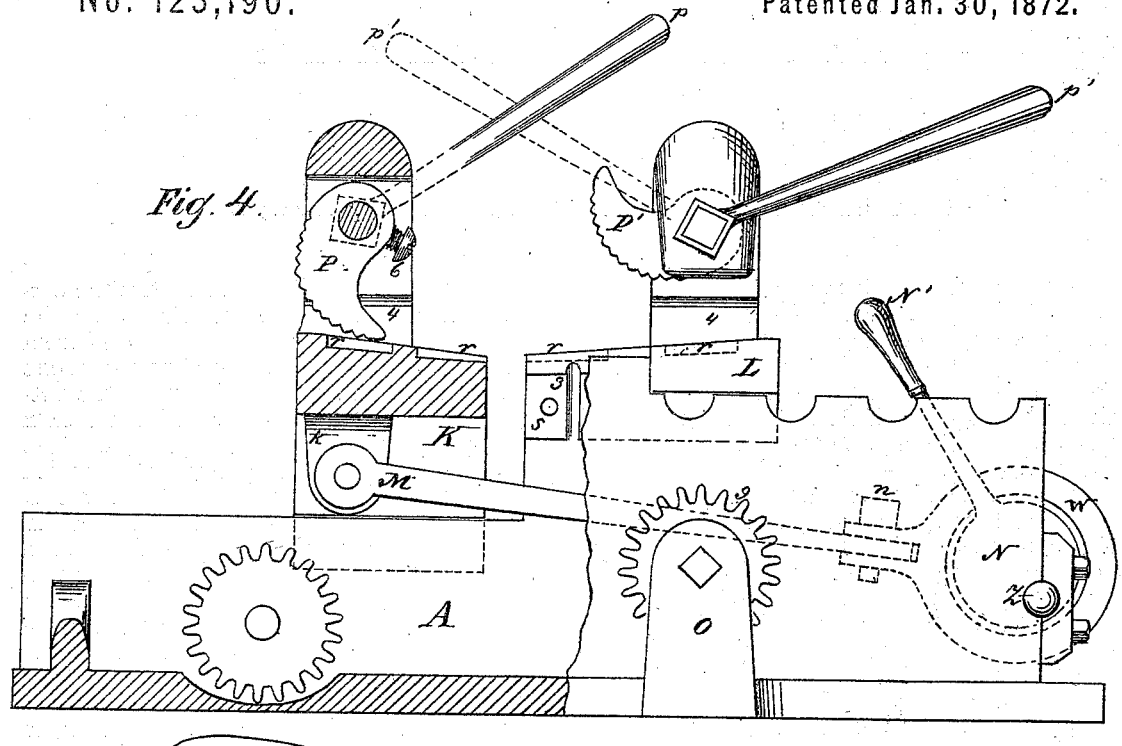
Figures 5, 6:
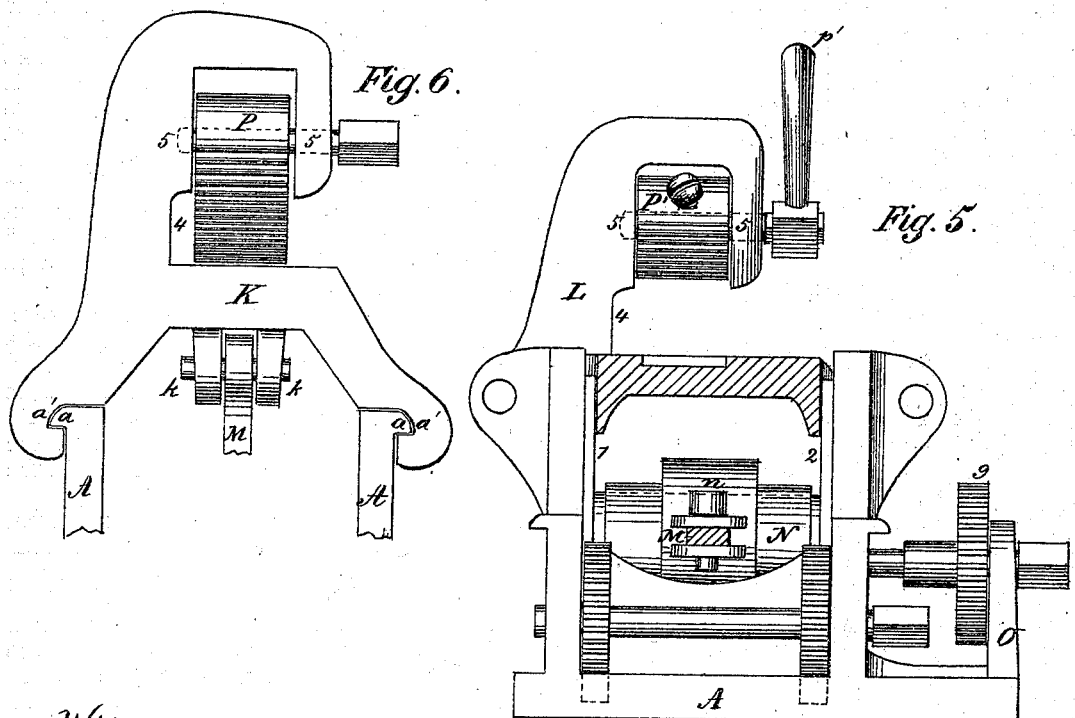

Figure 1 is a side elevation of the machine arranged for tire-bending, partially in section. Fig. 2 is an end view of same. Fig. 3 is a detached view of the central roller, the arched support being in section. Fig. 4 is a side elevation, partially in section, with the shrinking devices attached. Fig. 5 is an end view of same, partially in section. Fig. 6 is a detached view of shrinking-block K.

My invention has for its object to provide a machine by which tires for wheels may be bent at any required circumference and at the same time avoid all lateral twisting; and it is an improvement on the machine patented to me November 23, 1869, antedated November 10, 1869, and No. 97,107. It also consists in providing the machine with a simple and effective means for shrinking the tire by forcing the iron together and condensing it, as hereinafter shown.

In order to enable others skilled in the art to make and use my invention, I will describe the manner in which I have carried it out.

In the accompanying drawing, A represents the frame of the machine, one portion of which is provided with a flange, $a$, Fig. 2, projecting over its edge. Near its center, on the inside, are molded the ribs 1 and 2, Fig. 5, and on the outside are cast the lugs $h$ $h'$ and the gearing-support O. In all other respects the frame is the same as shown in my patent above referred to. The center roller C has its bearings in grooves on the frame A at H, and in an arched support, I, which is secured to the frame by means of pins through the lugs $h$ $h'$. (See Fig. 2.) This roller, which has its ends grooved out, as shown in Fig. 3, at $c$ $c$, may be provided at the end of its shaft with a gear-wheel, I', and when great power is to be exerted it may be engaged with a smaller gear-wheel, 9, having bearings in O.

The operation of bending tire is the same as with my machine secured by the patent above referred to.

When it is desired to shrink a tire the carriage F and rollers B D are lifted from the frame A, the arched support I loosened from the lug $h'$, and with the roller C turned to one side and out of the way, as shown by the dotted lines in Fig. 2. The blocks K L are then placed in position, as shown in Fig. 4. The block K is provided with grooves $a'$ $a'$, which fit snugly over the flanges $a$ $a$ on the frame A. (See Fig. 6.) To the bottom of the block K are secured the lugs $k$ $k$, between which is pinned the head of the bar M. The upper portion of the blocks K and L are bent, as shown in Figs. 5 and 6, and furnish bearings for the shafts 5 5, on which are secured the clamps P P'. These clamps are operated by means of the levers $p$ $p'$, as shown in Fig. 4. The faces of the blocks are recessed, as shown at $r$ $r$, to give greater holding power to the clamps P P' during the process of shrinking the tire. The block L is grooved at 3 3, Fig. 4, so as to fit over the ribs 1 2, Fig. 5. When this block is placed on the ribs it is held securely in that position by the pin $s$, which passes through the side of the frame A, (see Fig. 4,) and into the block. Both of the blocks K L are recessed on their upper and inner sides at 4 4, (see Figs. 5 and 6,) for the purpose of allowing the rough or uneven edges of the tire to pass clear of the clamp and to secure an evenness of pressure upon the surface of the tire during the process of shrinking. Upon the shaft Z, having its bearings in the end of the frame A, is secured the eccentric N, having the lever N'. (See Fig. 4.) On this eccentric is placed the sleeve W, to which is attached the end of the bar M by the pin $n$.

The mode of shrinking the tire is as follows: The block K and lever N' are placed in position, as shown in Fig. 4. The tire to be shrunk is placed upon the faces of the blocks K L and beneath the clamps P P'. The levers are then brought into position, as shown at $p$ and $p'$, the latter in dotted lines. The tire is thus secured in position, and then, by drawing back the lever N', the eccentric N, through the connecting-bar M, forces forward the block K toward the block L, which process necessarily shrinks or shortens the tire to an extent equal to the forward movement of the block K.

I do not wish to limit myself to any particular form of clamp, eccentric, or lever, as these may be varied without departing from the spirit of my invention.

The object of grooving or beveling the center roller C at c c, as shown in Fig. 3, is to allow the ragged edges of the tire to pass freely and without jamming the rollers, as is liable to be the case with a center roller constructed as shown in my patent above referred to.

Claims.

I claim as an improvement in tire-bending machines—

1. The combination of the adjustable grooved and flanged rolls B D, of the plain roll C with working-surface of equal or less length than the working-surfaces of the rolls B D between the grooves, as and for the purpose set forth.

2. The combination of the subject-matter of the preceding claim with the hinged housing I, as and for the purpose set forth.

3. In combination with the frame A of the tire-bending machine, the shrinking-blocks K L, clamps P P', bar M, sleeve W, and eccentric N, as and for the purpose set forth.

JOHN NAUGLE.

Witnesses:
 FRED. ARTOS,
 HERM. LAUTEN.